United States Patent [19]

Scott et al.

[11] Patent Number: 5,248,484
[45] Date of Patent: Sep. 28, 1993

[54] ATTRITION REACTOR SYSTEM

[75] Inventors: Charles D. Scott, Oak Ridge; Brian H. Davison, Knoxvile, both of Tenn.

[73] Assignee: Martin Marietta Energy Systems, Inc., Oak Ridge, Tenn.

[21] Appl. No.: 945,997

[22] Filed: Sep. 15, 1992

Related U.S. Application Data

[63] Continuation of Ser. No. 740,253, Aug. 5, 1991, abandoned.

[51] Int. Cl.$^5$ .............................................. B01F 8/00
[52] U.S. Cl. .............................. 422/225; 422/224; 422/232; 422/234; 241/46.17
[58] Field of Search .............................. 422/224–225, 422/232, 234; 241/46.17

[56] References Cited

U.S. PATENT DOCUMENTS

| | | | |
|---|---|---|---|
| 3,043,526 | 7/1962 | Cowles | 241/46.17 |
| 3,085,756 | 4/1963 | Danforth et al. | 241/46.17 |
| 3,308,037 | 3/1967 | Goos et al. | 435/99 |
| 3,318,248 | 5/1967 | Rembold | 241/46.17 |
| 3,337,414 | 8/1967 | Wilson | 435/99 |
| 3,679,431 | 7/1972 | Clayton et al. | 435/93 |
| 3,989,848 | 11/1976 | Moll et al. | 435/93 |
| 4,254,150 | 3/1981 | Fritze et al. | 435/99 |
| 4,302,543 | 11/1981 | Benyaev et al. | 435/99 |
| 4,321,328 | 3/1982 | Hoge | 435/165 |
| 4,326,036 | 4/1982 | Hayes | 435/163 |
| 4,334,026 | 6/1982 | Chynoweth et al. | 435/163 |
| 4,338,399 | 7/1982 | Weil et al. | 435/99 |
| 4,370,172 | 1/1983 | Guesissaz | 127/37 |
| 4,384,897 | 5/1983 | Brink | 127/37 |
| 4,400,218 | 8/1983 | Koch et al. | 127/37 |
| 4,409,329 | 10/1983 | Silver | 435/105 |
| 4,414,330 | 11/1983 | Zucker et al. | 435/93 |
| 4,416,989 | 11/1983 | Kretz | 435/93 |
| 4,427,453 | 1/1984 | Reitter | 127/37 |
| 4,529,699 | 7/1985 | Gerez et al. | 435/165 |
| 4,578,353 | 3/1986 | Assarsson et al. | 435/165 |
| 4,642,287 | 2/1987 | Inoi et al. | 127/37 |
| 4,952,503 | 8/1990 | Granstedt | 435/165 |

OTHER PUBLICATIONS

Neilson, M. J., et al, *Biotechnol. Bioeng.* 24, 293 (1982).
Ryu, S. K., and Lee, J. M., *Biotechnol. Bioeng.* 25, 53 (1983).
Deeble, M. F., and Lee, J. M., *Biotechnol. Bioeng.* 15, 277 (1985).
Jones, E. O., and Lee J. M., *Biotechnol. Bioeng.*, 31, 35 (1988).

*Primary Examiner*—Robert J. Warden
*Assistant Examiner*—Krisanne M. Thornton
*Attorney, Agent, or Firm*—J. A. Marasco; H. W. Adams

[57] ABSTRACT

A reactor vessel for reacting a solid particulate with a liquid reactant has a centrifugal pump in circulatory flow communication with the reactor vessel for providing particulate attrition, resulting in additional fresh surface where the reaction can occur.

5 Claims, 2 Drawing Sheets

ATTRITION REACTOR SYSTEM

The United States Government has rights in this invention pursuant to contract no. DE-AC05-84OR21400 between the United States Department of Energy and Martin Marietta Energy Systems, Inc.

This application is a continuation of application Ser. No. 07/740,253, filed Aug. 5, 1991, now abandoned.

FIELD OF THE INVENTION

The present invention relates to liquid/solid particulate reactor systems, and more particularly to liquid/solid particulate reactor systems with coupled particulate attritors.

BACKGROUND OF THE INVENTION

Many chemical or biochemical reaction systems utilize a solid phase as a feed material substrate or reagent. In most cases, such materials are size-reduced prior to introduction to the reactor so that there is a significant amount of interacting surface available. For some systems, the surface interactions may ultimately use up available reactants on the substrate surface and, thus, result in a significant reduction in the overall rate of reaction. This is certainly the case for the enzymatic hydrolysis of cellulose in lignocellulosic solids by cellulase enzymes. What is needed is a periodic or continuous replenishment of fresh substrate surface on the solid particulates so that a high rate of reaction can be maintained.

It has been shown that the use of additional attrition during the course of enzymatic cellulose hydrolysis can materially enhance the reaction rate and yield. The most successful demonstration of attrition was carried out in a small reactor in which large rotating paddles were used to continuously stir a bed of steel balls within the reactor chamber. The moving steel balls provided sufficient shear force to continue to attrit the solid cellulosic particles and provide fresh substrate surfaces for enzymatic attack. The reaction rate was enhanced, but unfortunately, it is very difficult to scale-up such a reactor concept since the paddles that move the steel balls around become progressively larger, heavier, more expensive, and require much greater power as the reactor becomes larger.

In order to further elucidate attrition reactor technology, the following publications are suggested:
1. Neilson, M. J., et al, *Biotechnol. Bioeng.* 24, 293 (1982).
2. Ryu, S. K., and Lee, J. M., *Biotechnol. Bioeng.* 25, 53 (1983).
3. Deeble, M. F., and Lee, J. M., *Biotechnol. Bioeng.* 15, 277 (1985).
4. Jones, E. O., and Lee, J. M., *Biotechnol. Bioeng*, 31, 35 (1988).

OBJECTS OF THE INVENTION

Accordingly, it is an object of the present invention to provide a new and improved attrition reactor system which is suitable for scale-up.

It is also an object of the present invention to provide an improved process for reacting a solid particulate with a liquid reactant.

Further and other objects of the present invention will become apparent from the description contained herein.

SUMMARY OF THE INVENTION

In accordance with one aspect of the present invention, the foregoing and other objects are achieved by an attrition reactor system which comprises a reactor vessel containing a solid particulate cellulosic substrate and a liquid hydrolyzing reactant, and a centrifugal pump in circulatory flow communication with the reactor vessel for providing particulate attrition, resulting in additional fresh cellulosic substrate surface where the hydrolyzing reaction can occur.

In accordance with another aspect of the present invention, a method for hydrolyzing a solid particulate cellulosic substrate with a liquid hydrolyzing reactant comprises the steps of:
providing a reactor vessel;
providing a centrifugal pump in circulatory flow communication with the reactor vessel;
introducing the solid particulate cellulosic substrate and liquid hydrolyzing reactant into the reactor vessel to form a slurry; and
activating the centrifugal pump so that the slurry is circulated through the attritor means so that the solid particulate cellulosic substrate is attrited, resulting in additional fresh cellulosic surface where the hydrolyzing reaction can occur.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
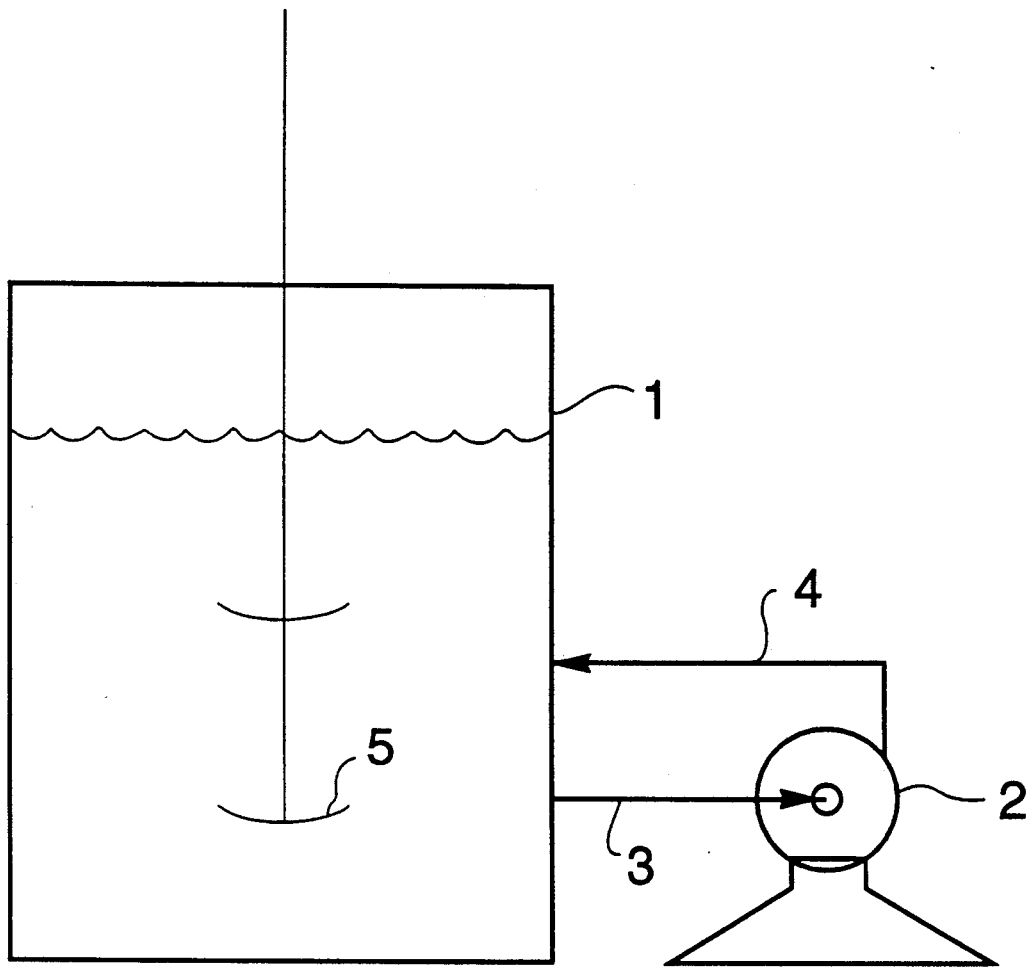
FIG. 1 is a schematic diagram of an attrition reactor system in accordance with the present invention.

With reference to FIG. 1, a reactor vessel 1, which can be a typical chemical reactor vessel or bioreactor vessel, is used to react a solid particulate with a liquid reactant. A high-shear attritor 2 provides attrition of solid particulates during the reaction process. The attritor 2 can be located within the reactor vessel 1, but it is very convenient and efficient to locate the attritor 2 outside the reactor vessel 2, and connect the attritor to the reactor vessel 1 with attritor feed 3 and return 4 lines, providing a circulatory flowpath for the contents of the reactor vessel 1.

The attritor 2 can be comprised of any means which produces a high-shear field for causing attrition or size reduction of the solid particulate. For many applications, the attritor 2 can be comprised of a high speed rotor contained in an enclosed chamber through which the slurry will pass. In many cases, a high-speed centrifugal pump can be used for this purpose. For large or particularly hard particulates, a grinder, shredder, blender, or other size reduction device may be utilized in place of, or in addition to, the pump. In any case, means to circulate the reactor contents through the attritor 2 can be provided by the attritor 2 itself, or by separate circulating means, such as a diaphragm pump or other type of pump. The attritor may comprise several devices in series, parallel, or complex configurations. Since the attritor 2 also mixes and circulates the cellulosic substrate, a stirring device 5 may be optional. The attritor may be operated constantly or intermittently.

The subject attrition reactor system is most useful in reaction processes where a solid particulate reactant cellulosic substrate needs to be repeatedly attrited to expose fresh cellulosic substrate surface for further reaction to occur. A typical process is the enzymatic hydrolysis of lignocellulosic materials.

EXAMPLE

Figure 2:
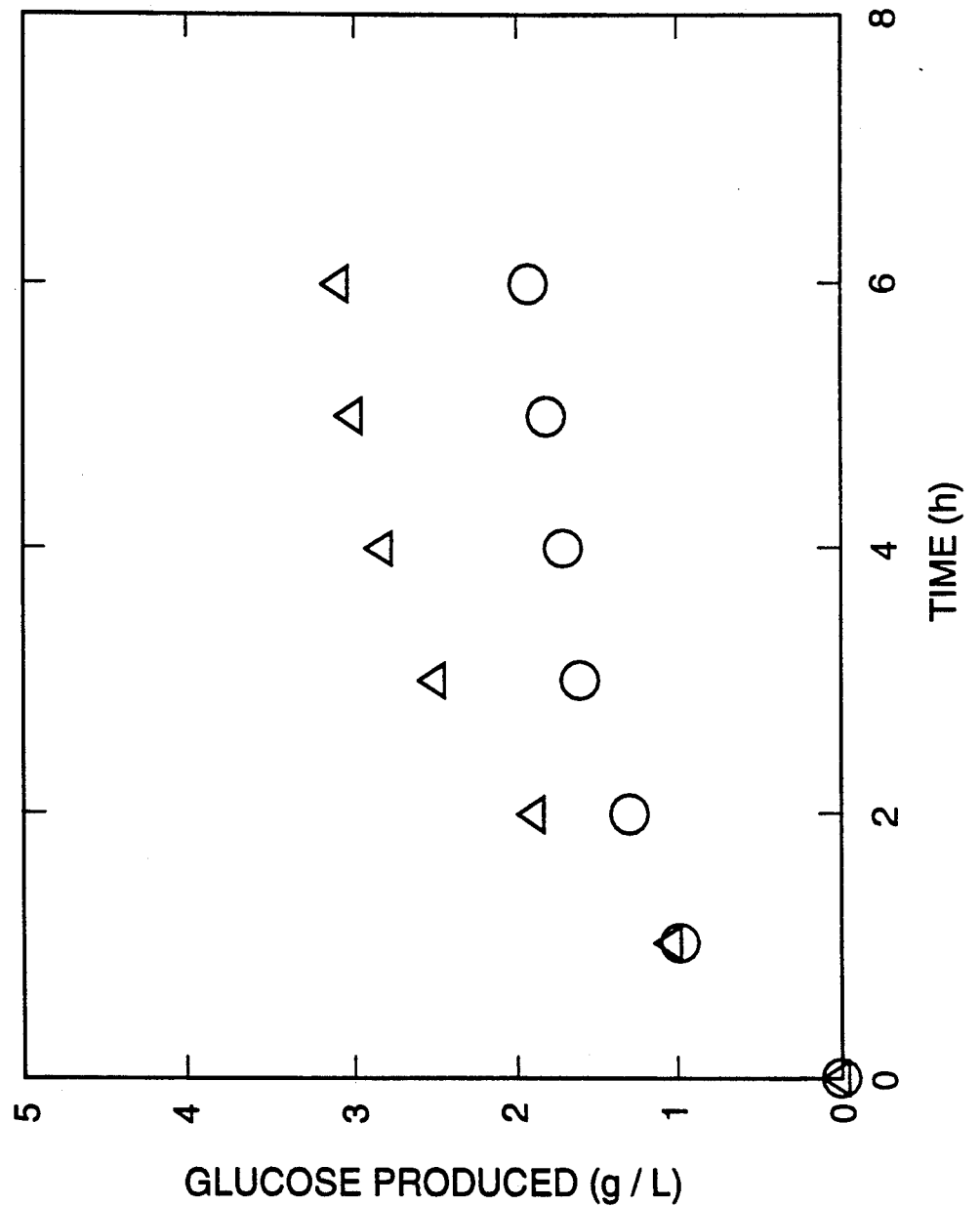
FIG. 2 is a graph of data representing glucose produced by hydrolysis of newsprint in accordance with the present invention.

A test of the subject attrition reactor system was made for the solubilization of waste paper by cellulase enzymes. A 4 L stirred tank reactor vessel was used. An attritor was provided by a small centrifugal pump which was connected to the reactor as shown in FIG. 1. The pump had a 3⅞" diameter internal circular cavity with a 3 3/16" diameter rotor having 6 vanes, and operated at 3450 RPM to pump at a flow rate of 10 to 12 L/min. A slurry was prepared by adding 1 wt % of used newsprint to 2 L water, shredding in a blender for 30 seconds, and adding crude cellulase extract at an enzyme loading of 3.5 IU/g of solid material. The slurry was buffered with an acetate buffer at a pH of 4.7. The slurry was reacted in the reactor vessel, maintained at a temperature of 50° C., to produce glucose predominantly, with other reducing sugars present. One test was made in which the contents of the reactor were gently stirred; the data points representing glucose production being shown in FIG. 2 as circles. A second test was made in which the slurry was circulated through the attritor; the data points representing glucose production being shown in FIG. 2 as triangles. In the second test, the contents of the reactor were periodically subjected to a significant shear force by the attritor, increasing glucose production by more than 50%.

It is therefore shown that the present invention is useful in chemical, biochemical, and biological reactions where the generation of fresh solid surface area is an important mechanism for enhancing the rate of reaction and overall conversion of reactant into product.

While there has been shown and described what are at present considered the preferred embodiments of the invention, it will be obvious to those skilled in the art that various changes and modifications can be made therein without departing from the scope of the inventions defined by the appended claims.

What is claimed is:

1. An attrition reactor system comprising a reactor vessel containing a solid particulate cellulosic substrate and an aqueous hydrolyzing reactant; and an attriting means, said attriting means comprising a centrifugal pump consisting essentially of a housing having an internal cavity and a rotor having vanes disposed in said cavity, said centrifugal pump being in circulatory flow communication with said reactor vessel, said centrifugal pump being operable at a speed sufficient to attrit said solid particulate cellulosic substrate sufficiently to react with said aqueous hydrolyzing reactant.

2. The attrition reactor system according to claim 1 wherein said centrifugal pump is located externally to said reactor vessel, and wherein said centrifugal pump further comprises attritor feed and attritor return lines to provide said circulatory flow communication.

3. A method for hydrolyzing a solid particulate cellulosic substrate comprising the steps of:
providing a reactor vessel;
introducing said solid particulate cellulosic substrate and an aqueous hydrolyzing reactant into said reactor vessel to form a slurry; and
attriting said solid particulate cellulosic substrate using an attriting means, said attriting means comprising a centrifugal pump consisting essentially of a housing having an internal cavity and a rotor having vanes disposed in said cavity, said centrifugal pump being in circulatory flow communication with said reactor vessel,
said attriting means circulating said slurry through said centrifugal pump and attriting said solid particulate cellulosic substrate sufficiently to react said solid particulate cellulosic substrate with said aqueous hydrolyzing reactant.

4. The method according to claim 3 wherein said centrifugal pump is located externally to said reactor vessel, and wherein said centrifugal pump further comprises attritor feed and attritor return lines to provide said circulatory flow communication.

5. A method for hydrolyzing waste paper comprising the steps of:
providing a reactor vessel;
introducing into said reactor vessel an aqueous slurry containing shredded waste paper having a surface and a cellulase enzyme for hydrolyzing said shredded waste paper;
operating said reactor vessel so that a hydrolyzing reaction occurs on said surface of said shredded waste paper; and
attriting said shredded waste paper using an attriting means, said attriting means comprising a centrifugal pump consisting essentially of a housing having an internal cavity and a rotor having vanes disposed in said cavity, said centrifugal pump being in circulatory flow communication with said reactor vessel,
said attriting means circulating said slurry through said centrifugal pump and attriting said shredded waste paper sufficiently to react said shredded waste paper with said cellulase enzyme.

* * * * *